J. FOX.

Improvement in Washing-Machines.

No. 131,091.　　　　　　　　　　　　　　Patented Sep. 3, 1872.

WITNESSES.　　　　　　　　　　　　　　INVENTOR.

Geo. E. Upham,　　　　　　　　　　　　John Fox.
D. D. Kane　　　　　　　　　　　　　　Chipman Hosmer & Co,
　　　　　　　　　　　　　　　　　　　　　attys.

UNITED STATES PATENT OFFICE.

JOHN FOX, OF OSKALOOSA, IOWA.

IMPROVEMENT IN WASHING-MACHINES.

Specification forming part of Letters Patent No. 131,091, dated September 3, 1872.

*To all whom it may concern:*

Be it known that I, JOHN FOX, of Oskaloosa, in the county of Mahaska and State of Iowa, have invented a new and valuable Improvement in Washing-Machines; and I do hereby declare that the following is a full, clear, and exact description of the construction and operation of the same, reference being had to the annexed drawing making a part of this specification, and to the letters and figures of reference marked thereon.

Figure 1:
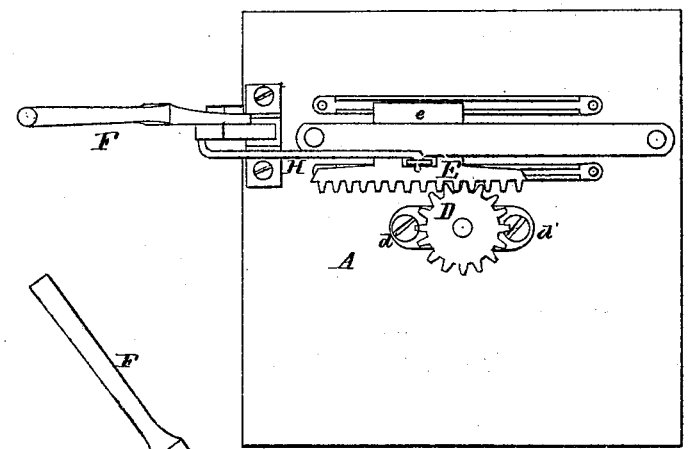
Figure 2:
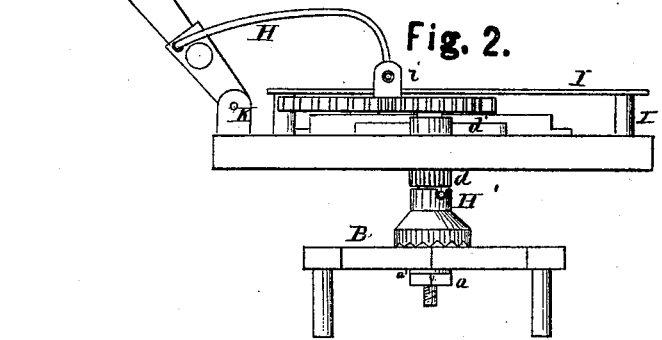
Figure 3:
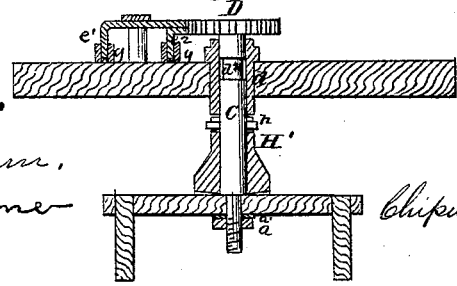

Figure 1 of the drawing is a representation of a plan view of my invention. Fig. 2 is a side elevation of the same. Fig. 3 is a sectional view of the same.

My invention has relation to washing-machines; and consists in the construction and novel arrangement of devices appertaining to a "beater" having reciprocating rotary motion given to it through the medium of a pinion, rack, and lever-handle, all as hereinafter more fully described.

Referring to the accompanying drawing, A designates the lid of a washing-machine, and B the beater or reel. The latter is secured to a vertical shaft, C, which passes through the lid, and holds, on its upper end, a pinion, marked D, which engages with a horizontally-reciprocating rack, E, actuated by means of a lever, F, connected therewith by means of a bent rod, H. The beater or reel may be of any desirable form adapted to rotary motion, and is placed on the lower end of the shaft C, which, being threaded, is provided with a nut, $a$, to hold the beater in position. A metallic washer, $a'$, preserves the beater from being injured by the nut, and prevents it from becoming loose on the shaft. The shaft C works in a thimble, $d$, which is inserted in an aperture of the lid A, and is constructed with the lateral elongations or lugs $d^1$, through which pass screws for fastening said thimble securely to the lid. The surface of the thimble below the lugs $d^1$ is fluted or corrugated, so that the thimble may be more easily driven into its socket, and there more rigidly retained than if made plain. A groove, $d^2$, is formed around the upper portion of the shaft, where it lies within the thimble. A double bearing is thus produced, friction somewhat avoided, and provision made for the reception and retention of a supply of lubricating-oil. Upon the middle part of the shaft C, or between the beater and thimble, is placed a collar, H′, having its lower end expanded or enlarged to the form of a disk, and serrated on its under surface. A pin, $h$, passes through the shaft C, and fits notches cut in the upper end and on opposite sides of the collar H′.

When the beater is fitted to the shaft and the nut tightened, the lower serrated end of the collar becomes embedded in the wood of the beater, forming a part thereof, while the upper notched end is keyed to the shaft by means of the pin $h$. By this means a rigid connection is produced between the beater and the shaft, which connection may be easily severed when it becomes necessary to take out the shaft for any purpose whatever.

The rack E is provided with a lug or extension, $e$, projecting from its back part at a point midway between its ends, and bent down at its rear extremity to form a flange or tongue, $e^1$. Another flange or tongue, $e^2$, is formed on the under side of the rack, as shown. These flanges are arranged to slide longitudinally between the walls of horizontal parallel plates $g$, properly flanged or grooved to receive them. The purpose of these flanges and the grooved plates, is to guide the rack in its horizontal reciprocating movement. The part $e$ of the rack-plate passes underneath a guard, consisting of a horizontal bar, I, supported upon posts I′. The part $e$ is made shorter than the rack, in order to allow the latter a sufficient longitudinal play upon a lid of limited width, and underneath a short guard. When the latter is short it has more rigidity, and is, therefore, better adapted to its purpose of preventing any vertical play of the rack. The guard passes over the part $e$ at a place midway between the guide-plates $g$. The rack-plate is provided, also, with a standard, $i$, to which is pivoted the bent rod, H, which is also pivoted to the side and lower part of the operating-lever F, arranged at one side of the lid A, and pivoted between upright plates K. The lever is arranged as close as possible to the pinion.

The object of having the connecting-rod H bent to the form shown, is to cause it to move in a line nearly parallel to the rack, and to thus prevent, as far as possible, any upward tendency of the latter during its movement.

What I claim as my invention, is—

The collar H', having its lower end serrated and its upper end notched, in combination with the beater B, shaft C, and pin $h$, substantially as described.

In testimony that I claim the above I have hereunto subscribed my name in the presence of two witnesses.

JOHN FOX.

Witnesses:
 F. M. DAVENPORT,
 JAS. B. BOLTON.